United States Patent Office 3,097,920
Patented July 16, 1963

3,097,920
REMOVAL OF CESIUM FROM AQUEOUS SOLUTIONS BY ADSORPTION
Kenneth C. Knoll, Richland, Wash., assignor to the United States of America as represented by the United States Atomic Energy Commission
No Drawing. Filed Oct. 30, 1961, Ser. No. 148,770
5 Claims. (Cl. 23—25)

This invention deals with a process of removing cesium values from aqueous solutions that contain the cesium in tracer or microconcentrations and other ions in macroconcentrations. The subject process is an adsorption process using clinoptilolite, and it is an improvement over the process of assignee's Patent No. 3,017,242, granted January 16, 1962, to Lloyd L. Ames. The process of this invention, like the process of the copending application, is applicable to the removal of cesium values from waste solutions as they have been obtained by the processing of nuclear fuel.

According to the process of the above-identified copending application the aqueous solution to be treated and containing the cesium values is contacted with clinoptilolite, whereby the cesium is taken up by said mineral, while the other cations present preferentially remain in the solution, and the cesium-containing clinoptilolite is then separated from the solution.

It is an object of this invention to provide a process for the adsorption of cesium values on clinoptilolite by which a better selectivity for the cesium is obtained than in the process of the above-identified copending application.

It is another object of this invention to provide a process for improved preferential adsorption of tracer or microquantities of cesium from a solution that contains also macroquantities of sodium, calcium and possibly other cations usually present in waste solutions obtained in the processing of nuclear fuel.

It has been found that the selectivity of the clinoptilolite for cesium values can be considerably increased if the clinoptilolite is subjected to a heat-treatment process prior to use, and more particularly to a temperature of about 400° C. for at least two hours.

The process of this invention thus comprises heating clinoptilolite at about 400° C. for at least two hours, cooling the clinoptilolite to room temperature, contacting the clinoptilolite with an aqueous solution containing cesium values in microquantities and other cations in macroquantities, whereby the cesium values are preferentially taken up by the clinoptilolite, and separating the solution containing said other cations from the cesium-containing clinoptilolite.

A comparison was made between the efficiency, for cesium adsorption, of untreated clinoptilolite and clinoptilolite that had been heated at 400° C. for four hours. For this purpose, the same amount of each type of clinoptilolite was contacted with the same volume of a solution, namely with a 1.0 M sodium nitrate solution which tracer quantities of Cs$^{137}$ had been added. The capacity of the heat-treated mineral was found twice that of the unheated clinoptilolite, since twice the volume of solution could be flowed over the heated clinoptilolite before 50% breakthrough point was reached as was done with the untreated clinoptilolite.

The following example was carried out for the study of the effect of different heat-treatment temperatures on the activity of the clinoptilolite.

EXAMPLE I

Samples of sodium-base clinoptilolite whose particles were of sizes between 0.4 and 0.7 mm. were heated to different temperatures, each time for four hours. Each of these samples, upon cooling, was brought in contact for 16 hours with a solution 1 M in sodium nitrate and "traced" with Cs$^{137}$ nitrate. After this period of time, the clinoptilolite was separated from the supernatant solution, and the distribution coefficients of cesium ($K_{Cs}$), namely the ratio of cesium activity per gram of clinoptilolite divided by cesium activity per ml. of supernatant was determined. The results are compiled in Table I.

Table I

| Temperature, °C.: | $K_{Cs}$ |
| --- | --- |
| Only air-dried at 105° C | 250 |
| 200 | 300 |
| 300 | 400 |
| 400 | 450 |
| 600 | 340 |
| 1100 | 1 |
| 1200 | 2 |

The above results indicate that heating to a temperature higher than 400° C. impairs the adsorption capacity and that optimum results are obtained with a heat treatment at about 400° C.

In the following example the effect of heating time on the adsorption capacity for cesium was determined.

EXAMPLE II

A number of clinoptilolite samples were heated at 400° C. for different periods of time. These samples, upon cooling, were used for treating the same type of cesium solution as was employed in Example I, and the conditions also were the same. The respective distribution coefficients obtained with the various samples of clinoptilolite are shown in Table II.

Table II

| Time held at 400° C., hours: | $K_{Cs}$ |
| --- | --- |
| 0 | 260 |
| 1 | 390 |
| 2 | 430 |
| 4 | 440 |
| 8 | 415 |
| 16 | 450 |

The above results suggest that the clinoptilolite should be heated at about 400° C. for at least two hours, but that heating for more than four hours does not bring about any further improvement.

The improvement of cesium adsorption upon heat treatment was found slightly smaller when the Cs$^+$/Na$^+$ ratio was increased in the solution; but the total adsorptive capacity, however, always was about the same. Therefore, the effect of the heat treatment was interpreted as an improvement in the selectivity of the clinoptilolite for cesium.

The cesium-containing clinoptilolite, after equilibration for several hours, is separated from the supernatant; this can be done by any means known to those skilled in the art. The cesium can be recovered from the clinoptilolite by elution with a salt solution, preferably one that can be decomposed by heat. Thus ammonium acetate was found a suitable eluant, but ammonium nitrate was by far the best eluant. An ammonium nitrate solution of an approximate concentration of 5 M yielded the very best results. In the case that the clinoptilolite is used in the sodium form, which is the preferred type, the sodium comes off first before much of the cesium is eluted. Thus the cesium can be recovered in a comparatively pure form, with only ammonia present as the additional ion, by discarding the first fraction of eluate. The eluate is then heated for decomposition of the ammonia whereby a pure cesium solution is obtained.

It will be understood that the invention is not to be limited to the details given herein but that it may be modified within the scope of the appended claims.

What is claimed is:

1. A process of separating microquantities of cesium values from aqueous solutions containing with said cesium values other ions in macroquantities, consisting in heating clinoptilolite at about 400° C. for at least two hours, cooling the clinoptilolite to room temperature, contacting the clinoptilolite with said aqueous solution to be treated, whereby cesium is preferentially taken up by the clinoptilolite, and separating the solution containing said other ions from the cesium-containing clinoptilolite.

2. The process of claim 1 wherein the clinoptilolite is heated for from two to four hours.

3. The process of claim 1 wherein the clinoptilolite is in the sodium form.

4. The process of claim 1 wherein the cesium values are eluted from the clinoptilolite with an aqueous solution of ammonium nitrate.

5. The process of claim 4 wherein the ammonium nitrate has a concentration of about 5 M.

References Cited in the file of this patent

UNITED STATES PATENTS

| | | |
|---|---|---|
| 726,091 | McKerrow | Apr. 21, 1903 |
| 3,017,242 | Ames | Jan. 16, 1962 |

OTHER REFERENCES

Ames, "The American Mineralogist," vol. 45, May-June 1960, pages 689–700.